United States Patent
Roodsari et al.

(10) Patent No.: US 11,107,139 B1
(45) Date of Patent: Aug. 31, 2021

(54) COMPUTING SYSTEM LEARNING OF A MERCHANT CATEGORY CODE

(71) Applicants: Erik Roodsari, Thousand Oaks, CA (US); Leandro Alves, Woodland Hills, CA (US); Gautam Saggar, Burbank, CA (US); Shalini Gurram, Simi Valley, CA (US); Krishna Kuppa, West Hills, CA (US)

(72) Inventors: Erik Roodsari, Thousand Oaks, CA (US); Leandro Alves, Woodland Hills, CA (US); Gautam Saggar, Burbank, CA (US); Shalini Gurram, Simi Valley, CA (US); Krishna Kuppa, West Hills, CA (US)

(73) Assignee: Intuit Inc., Mountain View, CA (US)

(*) Notice: Subject to any disclaimer, the term of this patent is extended or adjusted under 35 U.S.C. 154(b) by 1010 days.

(21) Appl. No.: 15/674,371

(22) Filed: Aug. 10, 2017

(51) Int. Cl.
G06Q 30/06 (2012.01)
G06Q 10/06 (2012.01)
(Continued)

(52) U.S. Cl.
CPC ......... *G06Q 30/0601* (2013.01); *G06F 40/40* (2020.01); *G06K 9/00469* (2013.01); *G06N 5/022* (2013.01); *G06N 20/00* (2019.01); *G06Q 10/0631* (2013.01); *G06Q 30/0201* (2013.01); *G06Q 50/01* (2013.01); *G06T 7/70* (2017.01)

(58) Field of Classification Search
CPC ........... G06Q 30/0601; G06Q 30/0201; G06Q 30/0631; G06Q 50/01; G06T 7/70; G06N 20/00; G06F 40/40; G06K 9/00469
See application file for complete search history.

(56) References Cited

U.S. PATENT DOCUMENTS 7,302,429 B1* 11/2007 Wanker .................. G06Q 30/02
9,665,662 B1* 5/2017 Gautam .................. G06F 40/40
(Continued)

OTHER PUBLICATIONS

Christopher D. Manning et al., Introduction to Information Retrieval: section on Tf-idf Weighting, available at <https://nlp.stanford.edu/IR-book/html/htmledition/tf-idf-weighting-1.html>, Apr. 7, 2009 (2 pages).

(Continued)

*Primary Examiner* — Matthew S Gart
*Assistant Examiner* — Stephen S Swartz
(74) *Attorney, Agent, or Firm* — Ferguson Braswell Fraser Kubasta PC

(57) ABSTRACT

A method for computing system learning of a merchant category code includes accessing a social media platform using administrative information of a merchant to obtain social media information of the merchant, and performing natural language processing on the social media information to add key terms to a merchant terminology corpus defined for the merchant. The key terms in the first merchant terminology corpus are normalized. For each key term in the first merchant terminology corpus and for each merchant category code, a frequency value for the merchant category code is calculated to obtain multiple frequency values. The method further includes aggregating frequency values across the first key terms in the first merchant terminology corpus to select the matching merchant category code of the merchant, and applying the matching merchant category code to the merchant.

20 Claims, 5 Drawing Sheets

(51) Int. Cl.
*G06Q 50/00* (2012.01)
*G06N 5/02* (2006.01)
*G06K 9/00* (2006.01)
*G06N 20/00* (2019.01)
*G06F 40/40* (2020.01)
*G06Q 30/02* (2012.01)
*G06T 7/70* (2017.01)

(56) References Cited

U.S. PATENT DOCUMENTS

| | | | | |
|---|---|---|---|---|
| 2007/0299743 | A1* | 12/2007 | Staib | G06Q 30/0204 |
| | | | | 705/7.33 |
| 2012/0036015 | A1* | 2/2012 | Sheikh | G06Q 30/0261 |
| | | | | 705/14.54 |
| 2015/0106244 | A1* | 4/2015 | Lo Faro | G06Q 40/12 |
| | | | | 705/30 |
| 2016/0086239 | A1* | 3/2016 | Musgrove | G06Q 30/0605 |
| | | | | 705/26.2 |
| 2016/0180245 | A1* | 6/2016 | Tereshkov | G06F 16/254 |
| | | | | 706/12 |
| 2018/0040073 | A1* | 2/2018 | Ghosh | G06Q 20/207 |
| 2018/0053211 | A1* | 2/2018 | Wallen | G06Q 30/0255 |
| 2018/0121971 | A1* | 5/2018 | Taneja | G06F 16/29 |
| 2018/0330258 | A1* | 11/2018 | Harris | G06N 5/003 |

OTHER PUBLICATIONS

Marvin Humphrey et al., Lingua-Stem-Snowball, available at <http://search.cpan.org/~creamyg/Lingua-Stem-Snowball0.952/lib/Lingua/Stem/Snowball.pm>, 2008 (4 pages).

Michael Gilleland, Levenshtein Distance, in Three Flavors, available at <https://people.cs.pitt.edu~kirk/cs1501/Pruhs/Spring2006/assignments/editdistance/Levenshtein%20Distance.htm>, 2006 (10 pages).

* cited by examiner

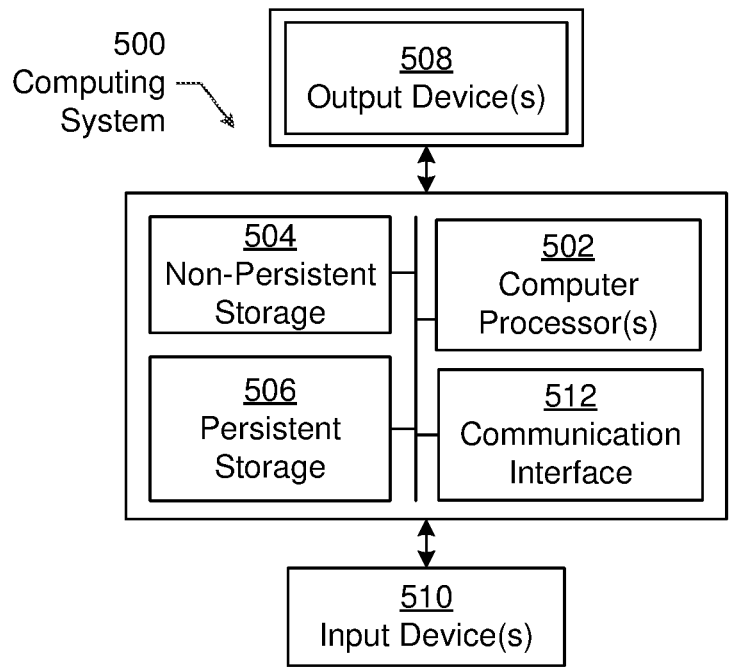
*FIG. 5.1*
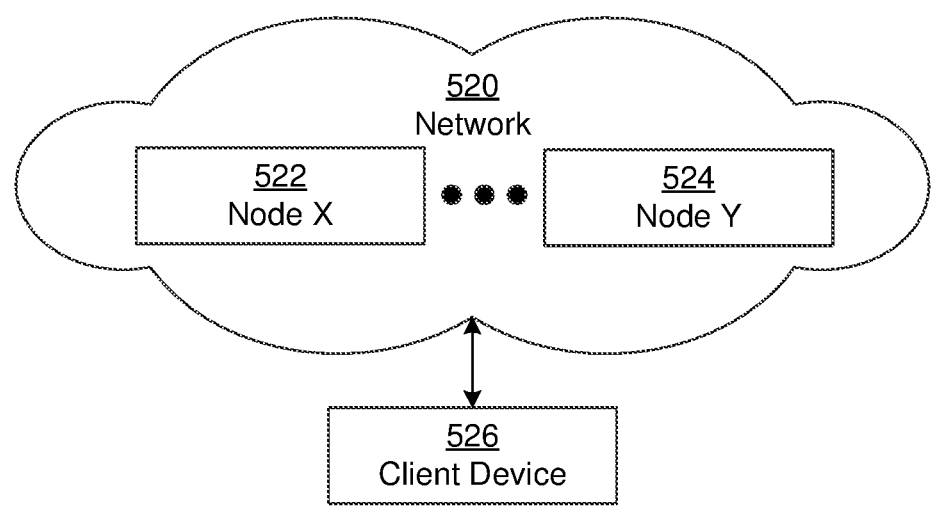
*FIG. 5.2*

COMPUTING SYSTEM LEARNING OF A MERCHANT CATEGORY CODE

BACKGROUND

A merchant is a business entity that trades in products for profits. Merchants sell products to the merchant's customers and often receive money for the products. To sell the products, a merchant uses a merchant account. A merchant account is a bank account at a financial institution that enables the holder to accept debit cards and credit cards for payment. In order to create a merchant account, the merchant provides administrative information about the merchant. Once piece of information is a merchant category code. A merchant category code is a multi-digit number that classifies the merchant by the type of products the merchant provides. Over seven hundred merchant category codes exist.

For smaller businesses, selecting a merchant category code may be challenging due to the number of merchant category codes. Further, some merchants may falsely select a merchant category code in order to avoid various regulations. Accordingly, a large percentage of merchants may be categorized as miscellaneous.

For example, consider the scenario in which a small business is a corner store that primarily sells bread and cakes made by the owners, and also has a small section for convenience goods, such as milk, eggs, and a few specialty items. When the small business owner applies for merchant account to accept credit card payments, the small business owner selects the merchant category code. For food based merchants, the merchant category codes include the following codes: (a) 5331 for Variety Stores, (b) 5399 for Miscellaneous General Merchandise, (c) 5411 for Grocery Stores, (d) 5411 for Supermarkets, (e) 5422 for Freezer and Locker Meat Provisioners, (f) 5422 for Meat Provisioners—Freezer and Locker, (g) 5441 for Candy Stores, (f) 5441 for Confectionery Stores, (g) 5441 for Nut Stores, (h) 5451 for Dairy Products Stores, (i) 5462 for Bakeries, and (j) 5499 for Miscellaneous Food Stores—Convenience Stores and Specialty Markets. Because the small business owner primarily sells breads and cakes, the small business owner may select (f) 5441 for Confectionery Stores or (i) 5462 for Bakeries. However, the small business owner may also think that, with the small section in the corner store, the following merchant category code is applicable: (j) 5499 for Miscellaneous Food Stores—Convenience Stores and Specialty Markets. Thus, the small business owner may have difficulty in selecting the appropriate merchant category code.

SUMMARY

In general, in one aspect, one or more embodiments relate to a method for computing system learning of a merchant category code. The method includes accessing a social media platform using administrative information of a merchant to obtain social media information of the merchant, and performing natural language processing on the social media information to add key terms to a merchant terminology corpus defined for the merchant. The key terms in the first merchant terminology corpus are normalized. For each key term in the first merchant terminology corpus and for each merchant category code, a frequency value for the merchant category code is calculated to obtain multiple frequency values. The method further includes aggregating frequency values across the first key terms in the first merchant terminology corpus to select the matching merchant category code of the merchant, and applying the matching merchant category code to the merchant.

In general, in one aspect, one or more embodiments relate to a system for computing system learning of a merchant category code, the system including a data repository for storing multiple merchant category codes, and a computer processor operably connected to the data repository and configured to execute a merchant category code predictor. The merchant category code predictor is for causing the computer system to access a social media platform using administrative information of a merchant to obtain social media information of the merchant, and perform natural language processing on the social media information to add key terms to a merchant terminology corpus defined for the merchant. The key terms in the first merchant terminology corpus are normalized. For each key term in the first merchant terminology corpus and for each merchant category code, a frequency value for the merchant category code is calculated to obtain multiple frequency values. The merchant category code predictor is for causing the computer system to aggregate frequency values across the first key terms in the first merchant terminology corpus to select the matching merchant category code of the merchant, and apply the matching merchant category code to the merchant.

In general, in one aspect, one or more embodiments relate to a non-transitory computer readable medium for computing system learning of a merchant category code. The non-transitory computer readable medium includes computer readable program code for accessing a social media platform using administrative information of a merchant to obtain social media information of the merchant, and performing natural language processing on the social media information to add key terms to a merchant terminology corpus defined for the merchant. The key terms in the first merchant terminology corpus are normalized. For each key term in the first merchant terminology corpus and for each merchant category code, a frequency value for the merchant category code is calculated to obtain multiple frequency values. The non-transitory computer readable medium further includes computer readable program code for aggregating frequency values across the first key terms in the first merchant terminology corpus to select the matching merchant category code of the merchant, and applying the matching merchant category code to the merchant.

Other aspects of the invention will be apparent from the following description and the appended claims.

BRIEF DESCRIPTION OF DRAWINGS

FIGS. 5.1 and 5.2 show diagrams of a computing system in accordance with one or more embodiments of the invention.

DETAILED DESCRIPTION

Figure 1:
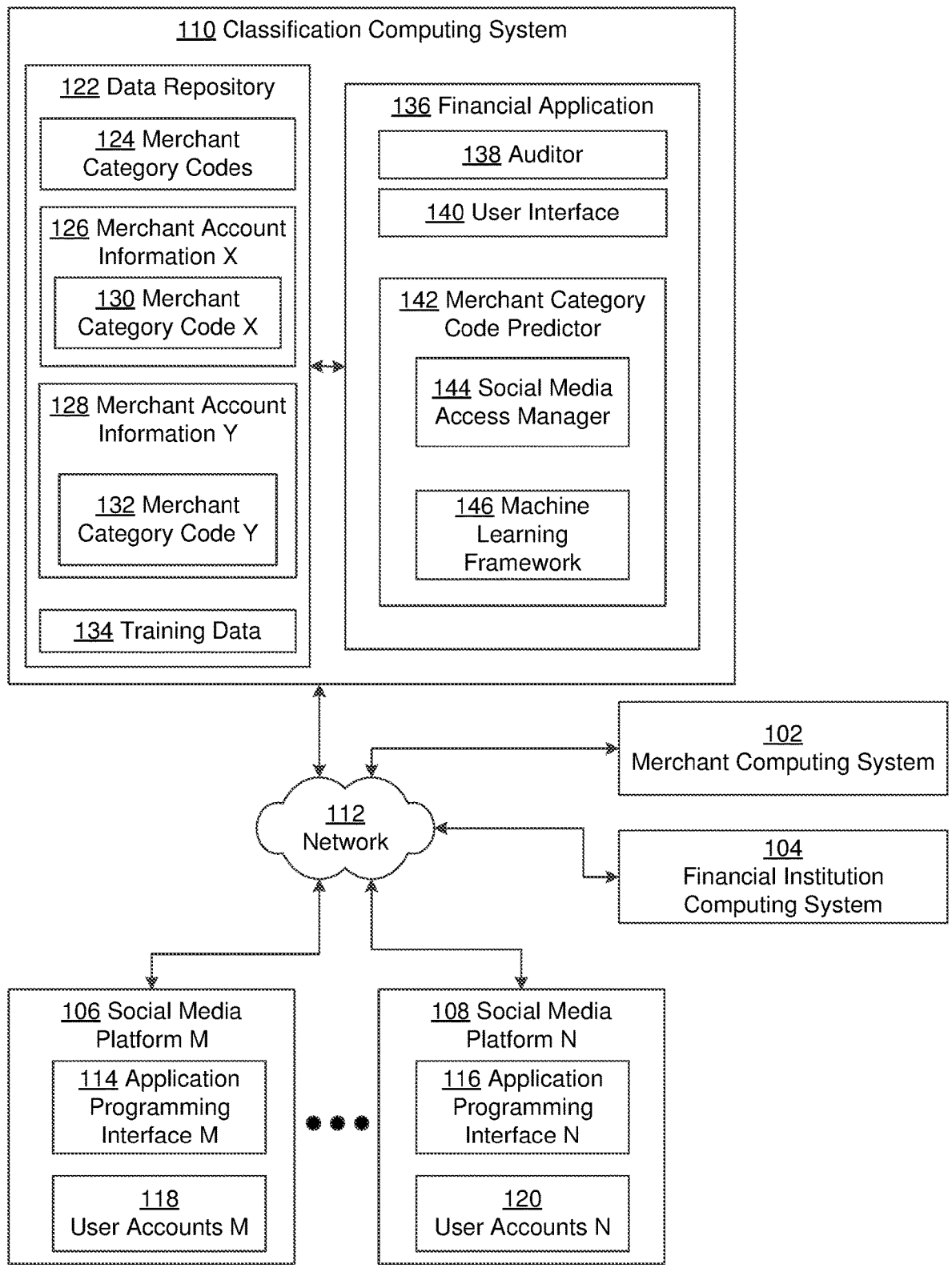
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to computing system learning of a merchant category code. A merchant category code is a multi-digit number that classifies the merchant by the type of products the merchant provides. For example, a merchant category code may be defined in ISO 18245 by the International Organization for Standardization. Because of the large number of merchant category codes as well as the various types of products merchants may offer, computing systems may have challenges in learning the merchant category code. One or more embodiments provide a computer framework for learning the merchant category code for a particular merchant. In one or more embodiments, administrative information of a merchant is used to access a social media platform and obtain social media information of the merchant. Natural language processing is performed on the social media information to add key terms to a merchant terminology corpus. Based on machine learning, the key terms are used to identify the merchant category code of the merchant.

FIG. 1 shows a diagram of a system in accordance with one or more embodiments of the invention. As shown in FIG. 1, the system includes a merchant computing system (102), a financial institution computing system (104), social media platforms (e.g., social media platform m (106), social media platform n (108)), and a classification computing system (110). The various computing systems and platforms shown in FIG. 1 may be or execute on the computing system shown in FIGS. 5.1 and 5.2 and described below. Further, the various components of FIG. 1 may be connected via a network (112), such as a network shown in FIG. 1 and described below. Each component of FIG. 1 is described below.

A social media platform (e.g., social media platform m (106), social media platform n (108)) is a computing platform that implements social media based communication between users. The social media platform implements a social network between users. As such, a social media platform is configured to receive a user's posting and transmit the posting to other users of social media. Example social media platforms include FACEBOOK® platform, YELP® platform, INSTAGRAM® platform, PININTEREST® platform, and other such platforms (FACEBOOK® is a trademark of Facebook, Inc. located in Menlo Park, Calif.; YELP® is a trademark of Yelp, Inc. located in San Francisco, Calif.; INSTAGRAM® is a trademark of Instagram, Inc. located in San Francisco, Calif.; and PINTEREST® is a trademark of Pinterest, Inc. located in San Francisco, Calif.). Each social media platform include functionality to store and manage user accounts (e.g., user accounts m (118), user accounts n (120)).

A user account (e.g., user accounts m (118), user accounts n (120)) is a computer account of a user that includes functionality to store social media information for the user. A user is any entity (e.g., individual, organization, or other entity) that uses the social media platform. Example users include the merchant (described below), the merchant's customers, critics of the merchant, and various other users. In other words, the information stored in the user account is applicable to the user. The social media information in the user account may include administrative information (e.g., name, social media identifier, nickname, physical business address, physical home address, website, phone number, and other such information), a description of the user (e.g., a description of the business in the case the user is a merchant), postings submitted to the social media platform by the user, postings submitted to the social media platform by other users and sent to the user, and other postings. Depending on the social media platform, each posting may include text, picture, multimedia, or combination thereof.

The social media platform (e.g., social media platform m (106), social media platform n (108)) may further provide an application programming interface (API) (e.g., application programming interface m (114), application programming interface n (116)) for accessing the social media platform. An API is a set of tools and functions that allows external software to communicate with the social media platform. In particular, using the published API, the external software may send requests and receive responses from the social media platform. The API may expose the social media information of users to the external software. For example, the API may provide an external interface for sending a query to the social media platform, where the query includes search criteria, and receiving a response having postings matching the search criteria to the external software.

Continuing with FIG. 1, a merchant computing system (102) is a computing system that is used by a merchant. A merchant is a business entity that trades in products for profits. Merchants sell products (e.g., goods/services) to the merchant's customers and receive money or goods for the products. The products sold by merchants are of a type. The type may be defined by the merchant category code. Because of the number of types and the variation in types, merchants may be unable to correctly identify the type of the merchant category code. As another example, the merchant may purposefully select an incorrect merchant category code to obfuscate the type of goods that the merchant actually sells (e.g., because of illegality, regulations, contract provisions, etc.). The merchant may use the merchant computing system (102) to connect to the classification computing system and other computing systems.

A financial institution computing system (104) is the various computing resources of a financial institution. For example, a financial institution may use the financial institution computing system (104) to connect to the classification computing system and merchant computing system (102). A financial institution provides merchant accounts to merchants. A merchant account is a specialized bank account used by the merchant to accept credit card payments, debit card payments, and other electronic payments. For example, the financial institution may be an underwriter of the merchant account, party to a merchant account agreement with the merchant, a payment processor, an independent sales organization (ISO), sponsoring bank, member service provider (MSP), other financial institution that is part of the merchant account processing.

A classification computing system (110) is a computing system that includes functionality to classify merchants in accordance with the associated merchant category code. The classification computing system (110) includes a data repository (122) and a financial application (136).

In one or more embodiments of the invention, the data repository (122) is any type of storage unit and/or device (e.g., a file system, database, collection of tables, or any other storage mechanism) for storing data. Further, the data repository (122) may include multiple different storage units and/or devices. The multiple different storage units and/or devices may or may not be of the same type or located at the same physical site.

The data repository (122) includes functionality to store merchant category codes (124), merchant account information (e.g., merchant account information x (126), merchant account information y (128)), and training data (134). The merchant category codes (124) are the available merchant category codes that may be assigned to particular merchants. Each merchant category code (124) may be related to a description of the type of products corresponding to the merchant category code. The merchant account information (e.g., merchant account information x (126), merchant account information y (128)) is information about a merchant account of a merchant. For example, the merchant account information may include administrative information of the merchant (e.g., merchant's legal name, merchant's doing business as (DBA) name, merchant identifier number (MID number), billing descriptor, physical business address, headquarters' address, physical mailing address, owner name, merchant website, email address, phone number, and other such information). The merchant account information may also include other information. At least some merchant account information (e.g., merchant account information x (126), merchant account information y (128)) includes an assigned merchant category code (e.g., merchant category code x (130), merchant category code y (132)). The assigned merchant category code (e.g., merchant category code x (130), merchant category code y (132)) is a merchant category code that is assigned to the merchant. The assigned merchant category code (e.g., merchant category code x (130), merchant category code y (132)) may be selected by the merchant and/or by the classification computing system (110). The assigned merchant category code may further be validated by the classification computing system (110), an individual, or a third party. In other words, the validated merchant category codes are merchant category codes that are deemed by the financial institution, and/or the classification computing system (110) to accurately match the type of products sold by the merchant.

Training data (134) corresponds to merchant account information (e.g., merchant account information x (126), merchant account information y (128)) having validated assigned merchant category codes. The training data (134) may be a reference to the merchant account information having validated assigned merchant category codes. For example, the training data (134) may be a list of unique identifiers of merchant account information. As another example, the training data (134) may be a copy of the merchant account information having validated assigned merchant category codes (e.g., merchant account information x (126), merchant account information y (128)).

A financial application (136) is a software application that provides financial services to merchants. For example, the financial application may be an accounting software package that provides merchant services. The financial application (136) provides functionality for a merchant to create a merchant account in accordance with one or more embodiments of the invention. In particular, a merchant may provide at least a portion of the merchant account information. The financial application (136) may guide the merchant to create merchant account and interface with one or more financial institutions to determine whether the merchant is authorized for a merchant account. In one or more embodiments, the financial application (136) includes an auditor (138), a user interface (140) and a merchant category code predictor (142).

The auditor (138) includes functionality to audit assignments of the merchant category codes to the merchants. In other words, the auditor includes functionality to validate merchant category codes. The auditor (138) operates in conjunction with the merchant category code predictor (142) to audit the assignment.

The user interface (140) is a graphical user interface that presents information to a merchant and receives information from the merchant. The user interface (140) includes functionality guide the user through submitting merchant account information. The user interface (140) may include functionality to recommend a merchant category code to the merchant. The user interface (140) may operate in conjunction with the merchant category code predictor (142) to recommend the merchant category code.

The merchant category code predictor (142) is a software process that includes functionality to predict the merchant category code for a merchant. The merchant category code predictor (142) includes a social media access manager (144) and a machine learning framework (146). The social media access manager (144) includes functionality to interface with the social media platforms (e.g., via the application programming interface, web crawling, etc.) and obtain social media information about the merchant. The machine learning framework (146) includes functionality to build merchant terminology corpuses, learn relationships between key terms in the merchant terminology corpuses and merchant category codes, and predict a merchant category code for a particular merchant.

A merchant terminology corpus for a merchant is a collection of key terms defined for a merchant. In other words, key terms in the merchant terminology corpus for the merchant are gathered for the specific merchant. Key terms in a merchant terminology corpus for a merchant category code include the key terms of the merchant terminology corpus of the merchants assigned to the merchant category code. In other words, the key terms in a merchant terminology corpus for a merchant category code span the merchants having the specific merchant category code assigned and validated to the merchant. Key terms may be individual words or collection of words. For example, household products, pet care, garage door opener, guns, etc. may be key terms.

While FIG. 1 shows a configuration of components, other configurations may be used without departing from the scope of the invention. For example, various components may be combined to create a single component. By way of a more specific example, the classification computing system ccc may be the same as or a part of the financial institution computing system (104). As another example, the classification computing system may be the same as or a part of the merchant computing system mmm. As another example, the functionality performed by a single component may be performed by two or more components.

Figure 2:
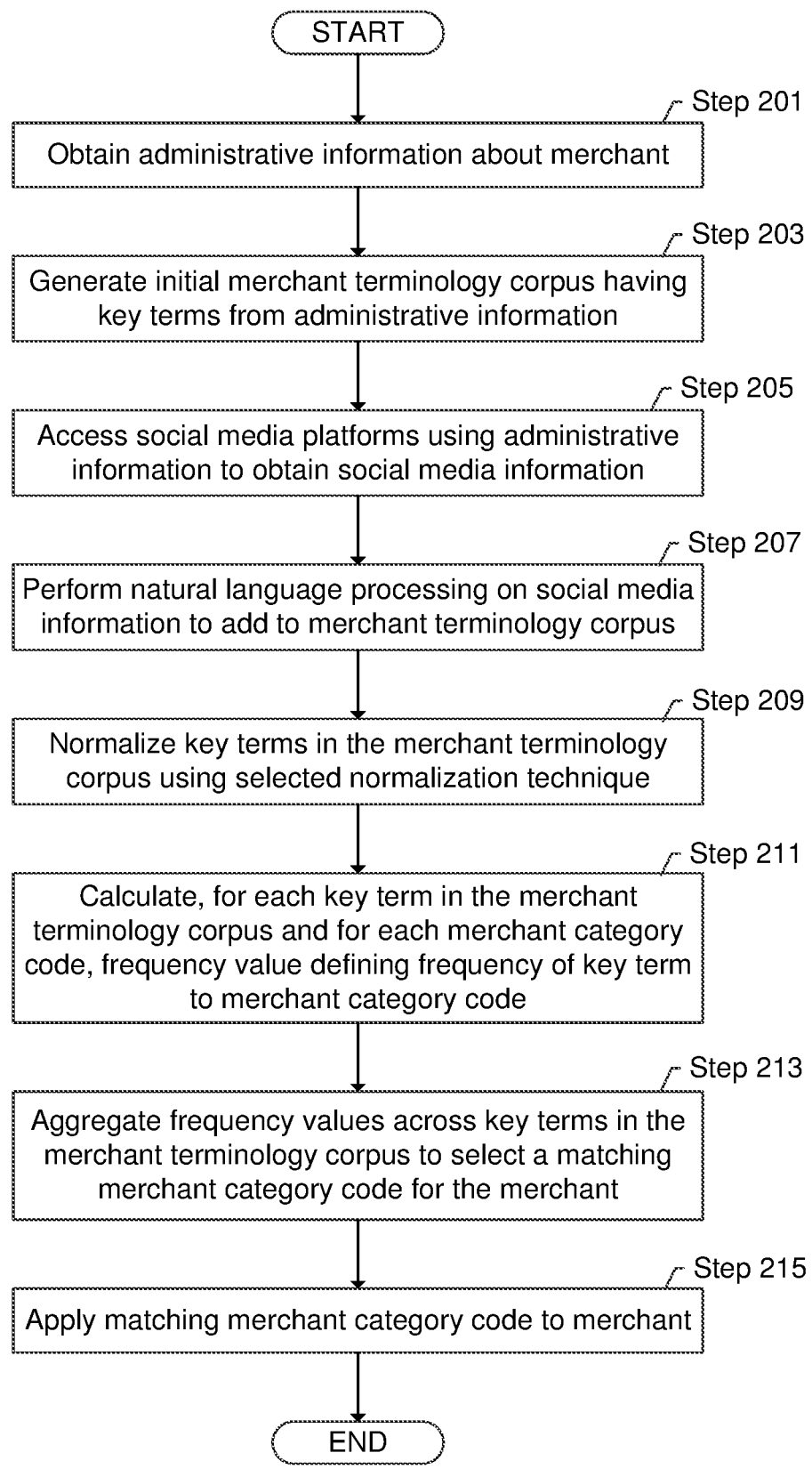
FIG. 2 shows a flowchart for predicting a merchant category code in accordance with one or more embodiments of the invention.
Figure 3:
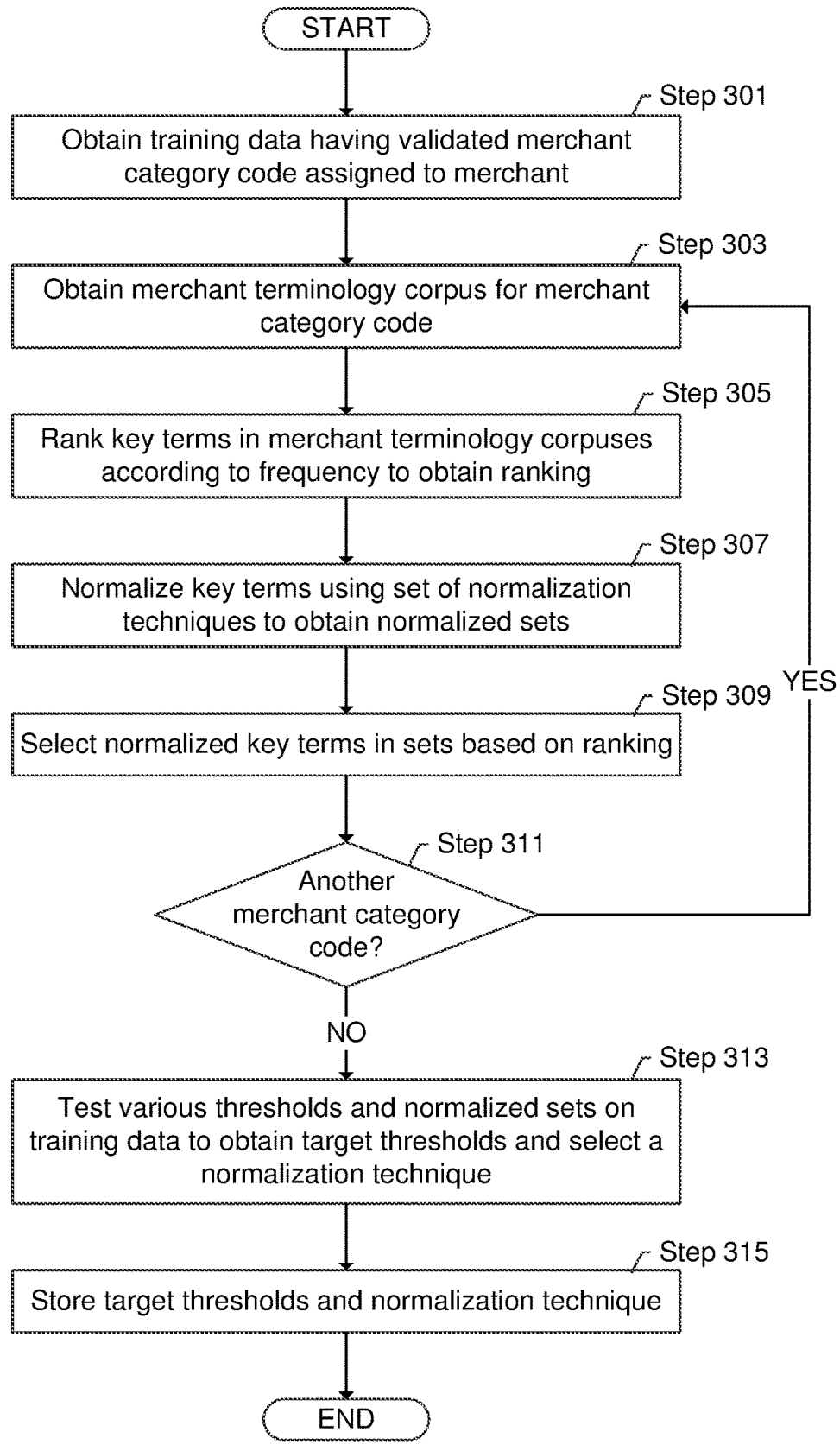
FIG. 3 shows a flowchart for training in accordance with one or more embodiments of the invention.

FIGS. 2 and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart in accordance with one or more embodiments of the invention. The operations of FIG. 2 may be performed by the various components of the financial application described above with reference to FIG. 1. In Step 201, administrative information about a merchant is received in accordance with one or more embodiments of the invention. In one or more embodiments, the administrative information is received from the merchant via the user interface. For example, the user interface may guide the merchant through submitting various types of administrative information. As used in the present application, the merchant is deemed to perform an action when a user or computing device performs the action on behalf of the merchant.

In some embodiments, the flowchart of FIG. 2 is performed as part of an auditing process. In such a scenario, the administrative information is obtained from the data repository after the merchant has completed the merchant account application. In some embodiments, the flowchart of FIG. 2 is performed while the merchant is completing a merchant account application. In such a scenario, the receipt of the administrative information and prediction of the merchant category code is performed in real-time.

In Step 203, an initial merchant terminology corpus having key terms is generated in accordance with one or more embodiments of the invention. The various units of administrative information are added to a merchant terminology corpus for the merchant. For example, the merchant legal name, the doing business address name, and any description that the merchant provides of the merchant's goods are added to the merchant terminology corpus.

In Step 205, various social media platforms are accessed using the administrative information to obtain social media information. Accessing the social media platforms may be performed by sending a query to the social media platform using the API of the social media platform. The query may include the merchant name and city and state of the merchant. If multiple matching social media user accounts are identified or if no matching social media user account is identified, then an additional query may be sent that additionally or alternatively includes the phone number of the merchant. If multiple matching social media user accounts are identified or if no matching social media user account is identified, then an additional query may be sent that includes the website address of the merchant. Other pieces of administrative information may alternatively or additionally be used. Once the social media user account is identified, social media information is gathered from the social media user account. The social media information that is gathered includes merchant posts, merchant provided descriptions, administrative information, customer posts and other account information may be gathered from the social media user account. Further, the social media information may include pictures and other multimedia content that is gathered from the social media user account.

Rather than or in addition to using the API of the social media platform, website crawling may be used to obtain the social media user account information. In such a scenario, a similar technique described above may be used to identify the social media user account of the merchant using the various units of administrative information. Further, the administrative information gathered from one social media user account of the merchant may be used to identify the social media user account of the merchant in another social media platform. For example, if the merchant does not provide a website address when submitting information to the merchant account application, but does list a website address in the social media information of a first social media user account, the website address may be used to identify a second social media user account on another social media platform.

Additionally, the web site of the merchant may be crawled to identify additional key terms. The key terms from the merchant website may be added to the merchant terminology corpus.

In Step 207, natural language processing is performed on the social media information to add to the merchant terminology corpus. One or more natural language processing algorithms may be used to identify key terms to add to the merchant terminology corpus. The natural language processing extracts key terms from the various portions of the social media information. During the natural language processing, certain portions of social media information may be given less weight than other portions of social media information. For example, a customer's post may have key terms that are given less weight than a merchant's post. Additionally, although not shown, image recognition may be applied to add additional key terms. For example, the image recognition may search for objects in the image, identify the objects with labels, and add the labels of the objects as key terms to the merchant terminology corpus.

In Step 209, the key terms in the merchant terminology corpus are normalized using a selected normalization technique. During training described below and in reference to FIG. 3, various normalization techniques are applied to the training data. The outcome of applying the various normalization techniques is used to select a normalization technique. The selected normalization technique is applied to the key terms in the merchant terminology corpus. The following are examples of normalization techniques that may be applied.

Levenshtein distance is a string metric for measuring the difference between two sequences. Informally, the Levenshtein distance between two words is the minimum number of single-character edits (insertions, deletions or substitutions) needed to change one word into the other. Levenshtein distance may be used to combine words that belong to the same family and combine scores for similar words, thereby producing better accuracy. Dynamic thresholds may be applied to set the maximum Levenstein distance. The dynamic thresholds may be learned through the process described below and in reference to FIG. 3.

Stem Snowball technique obtains the key term and normalizes the key term to deliver the root or stem word to be used as a true key term for matching along with accuracy percentage. Stem Snowball excludes the suffix of words, finding the root word and excluding the extraneous variations. For example, paint is the root of painting, painter, painters, painted, and so on. The root identified in Stem Snowball replaces the corresponding key terms.

Key terms in the merchant terminology corpus may further be filtered according to the training performed as described below and in reference to FIG. 3. In particular, key terms that are not in the merchant terminology corpus of a merchant category code may be filtered or removed from the merchant terminology corpus of the merchant.

In Step 211, for each key term in the merchant terminology corpus and for each merchant category code, a frequency value is calculated where the frequency value defines the frequency of the key term in the merchant category code. In one or more embodiments, Term Frequency-Inverse Document Frequency (TF-IDF) may be used to determine key term commonality in the given merchant category code. TF-IDF may also be used to identify the uniqueness of the key term in a list of multiple MCCs. Based on the commonality and uniqueness, a frequency value is assigned. The frequency value may be a number of times that the key term is in the merchant category code divided by a number of merchant category codes having the key term. In other words, the numerator is the number of times that the key term is identified in a particular MCC, and the denominator is the number of different merchant category codes in which the key term is identified. The frequency value therefore specifies how generic or specific the key term is.

In one or more embodiments, the frequency value may be calculated using the following equation (Eq. 1).

$$\text{Frequency\_Value} = \frac{\left(KW * \frac{TF}{IDF} * OW * MT\right)^{FW}}{MM} \quad \text{(Eq. 1)}$$

In Eq. 1, KW is key term weight, which is the number of times the key term is associated with the MCC. TF is the term frequency, which is the count of the key term in the MCC divided by the total count of key terms in the MCC. IDF is the inverse document frequency or the total number of MCCs divided by the number of MCCs associated with this key term. TF/IDF is the frequency value in accordance with one or more embodiments of the invention. OW is online key term weight. The online key term weight is the dynamic value generated during the training and applied in case the key term was found in online external source, such as the merchant website and. PW is the prime key term weight, which is a dynamic value generated during the training. MT is matches or a coefficient proportional to successful matches in which the key term participated. MM is mismatches, which is a coefficient proportional to unsuccessful matches in which the key term participated.

In Step 213, the frequency values across the key terms in the merchant terminology corpuses are aggregated to select a matching merchant category code for the merchant. The key terms are aggregated to obtain an aggregated value for the merchant and merchant category code pair. The optimal aggregated value (e.g., highest value) is selected. Aggregating the key terms may include, for each merchant category code, summing the frequency values of key terms in the merchant category code to obtain a sum for the merchant category code. In one or more embodiments, the frequency values are multiplied by corresponding weights prior to aggregating to obtain an aggregated value. For example, a weighted average of the frequency values or a weighted sum of the frequency values may be used for the aggregation. The merchant category code with the greatest sum may be selected as matching the merchant. By way of another example, aggregating may be, for each merchant category code, averaging the frequency values of key terms in the merchant category code to obtain an average for the merchant category code. The merchant category code with the highest average may be selected as matching the merchant.

Other techniques may be applied to aggregate frequency values. The merchant category code having the optimal aggregated value is selected as matching the merchant.

In Step 215, the matching merchant category code is applied to the merchant. In one or more embodiments, if the technique performed in FIG. 3 is to audit merchants, then applying the matching merchant category code may be to validate the merchant provided merchant category code with the matching merchant category code. For example, the validation may be to check whether the matching merchant category code is the same as the matching merchant category code. If not the same, an alert may be generated. The alert may be sent to the financial institution, the merchant, or another entity. The alert may trigger a secondary validation of the merchant category code, such as by a human or by another mechanism. As another example, the alert may trigger a denial of the merchant account. As another example, the alert may be sent to the merchant to recommend that the merchant change the merchant account application.

In one or more embodiments, applying the merchant category code may include adding the merchant category code to the merchant account application. For example, the matching merchant category code may be presented to the merchant as a recommendation. In some embodiments, multiple merchant category codes are presented. With or without the merchant selecting a recommendation, the matching merchant category code may be populated in merchant account application. The merchant may submit the merchant account application to apply for the merchant account.

FIG. 3 shows a flowchart for training the machine learning framework in accordance with one or more embodiments of the invention. In Step 301, training data having a validated merchant category code assigned to the merchant is obtained. In one or more embodiments, the financial application continually operates to train and retrain the machine learning framework. Thus, as new merchant account information with a matching merchant category code is validated, the merchant account information is used as training data. The training data may be obtained from the data repository.

In Step 303, a merchant terminology corpus for the merchant category code is obtained in accordance with one or more embodiments of the invention. Steps 303-311 may be performed individually for each merchant category code. The merchant terminology corpus for the merchant category code is the merchant terminology corpus for each merchant assigned to the merchant category code in the training data. In other words, the merchant terminology corpus of the merchant category code spans the merchant terminology corpuses of the merchants assigned to the merchant category code. Redundant key terms are kept in the merchant terminology corpus of the merchant category code. The merchant terminology corpus further includes the social media information and other information gathered for each merchant assigned to the merchant category code. The merchant terminology corpus for the merchant that is used may be prior to filtering and normalization described above with reference to FIG. 2. In other words, the merchant terminology corpus for the merchant category code may have raw data that is not normalized and not filtered.

In Step 305, key terms in the merchant terminology corpus of the merchant category code are ranked according to frequency to obtain a ranking. In other words, the number of times that each key term appears in the merchant terminology corpus of the merchant category code is related to the key term. For example, if the key term appears ten times in the merchant terminology corpus of the merchant category code, then the number ten is related to the key term regardless of the number of merchants having the key term. In some embodiments, the number of times is the number of merchants having the key term in the merchant terminology corpus of the merchant. For example, if the key term appears nine times in the merchant terminology corpus of a first merchant and one time in the merchant terminology corpus of a second merchant, then the number two is related to the key term in the merchant terminology corpus of the merchant category code. The number related to the key term is used for the ranking. In particular, key terms related to a greater number are ranked higher than key terms related to a lower number. Other techniques may be used to rank key terms in the merchant terminology corpus of the merchant category code.

In Step 307, key terms are normalized using a set of normalization techniques to obtain normalized sets in accordance with one or more embodiments of the invention. In one or more embodiments, each normalization technique is independently applied to the merchant terminology corpus to obtain a normalized set of key terms. Thus, a single merchant category code may be associated with multiple normalized sets, whereby each normalized set corresponds to a different normalization technique. Applying a normalization technique may be performed as discussed above with reference to Step 209 of FIG. 2. When performing the normalization, key terms that are related to each other through the normalization have the number related to the key terms summed. For example, if painting is related to the number two in Step 305 and painted is related to the number five in Step 305, then paint is related to the number seven (i.e., two plus five) in the normalized set corresponding to Stem Snowball.

In Step 309 of FIG. 3, normalized key terms are selected from the normalized sets based on the ranking. A threshold number of key terms are selected for each normalized set based on the ranking. Non-selected key terms are filtered or removed from the normalized set. Filtering or removal may be to delete or ignore the key term in later processing. Thus, the normalized sets are filtered normalized sets having only a subset of key terms.

In Step 311, a determination is made whether another merchant category code exists. If another merchant category code exists, the flow proceeds to Step 303 to select the next merchant category code. If another merchant category code does not exist, the flow proceeds to Step 313.

In Step 313, various thresholds and normalized sets are tested on the training data to obtain target thresholds and to select the normalization technique. In other words, different thresholds are applied to the filtered normalized sets to determine, for a collection of merchants in the training data, an accuracy measure. The accuracy measure is a measure of how close the predicted merchant category code is to what has been independently validated by the human process. The greatest accuracy occurs when the merchant category code matches the trained data exactly, while the accuracy measure may still be acceptable to be within the same family of merchant category codes, also defined by the training data. The training process is repeated multiple times to arrive at the result. As the test data changes and data increases in reliability, the repeating of the process of FIG. 3 causes the thresholds to dynamically adjust to optimize the output. The repetition may be accomplished by rescanning the data repository to reassess the weights.

In Step 315, target thresholds and a normalization technique are stored. The target thresholds and normalization techniques are used in performing the operations of FIG. 2 to select a matching merchant category code of a merchant.

Figure 4:
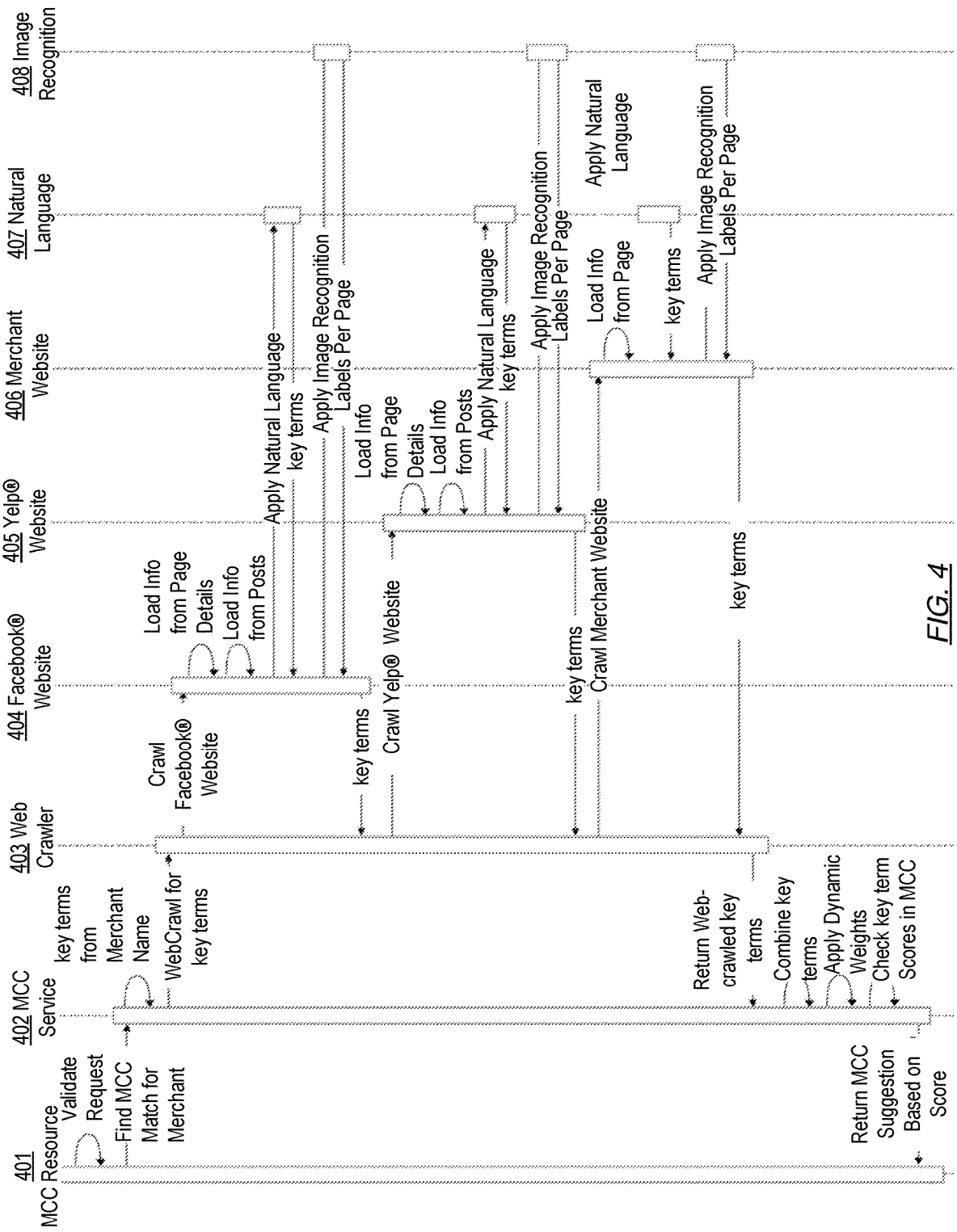
FIG. 4 shows an example sequence diagram in accordance with one or more embodiments of the invention.

FIG. 4 is an example sequence diagram in accordance with one or more embodiments of the invention. The following example is for explanatory purposes only and not intended to limit the scope of the invention. First, a merchant category code (MCC) resource (401) receives a request for a merchant category code and validates the request. For example, the MCC resource (401) may be the user interface that guides the user through creating a merchant account. The MCC resource (401) sends a request to the MCC service (402) to find a match for the merchant. For example, the MCC service (402) may be the merchant category code predictor. The MCC service (402) obtains key terms from the merchant name and instantiates a web crawler (403) to gather key terms. The web crawler (403) crawls the FACEBOOK® website (404), which loads social account information from the page and loads social account information from posts (FACEBOOK® is a trademark of Facebook, Inc. located in Menlo Park, Calif.). A natural language processor (407) is applied to obtain key terms. Further, image recognition (408) is applied to obtain labels, which are converted to key terms. The key terms from the natural language processor and image recognition are obtained by the web crawler (403).

Similarly, the web crawler (403) crawls the YELP® website (405), which loads social account information from the page and loads social account information from posts (YELP® is a trademark of Yelp, Inc. located in San Francisco, Calif.). A natural language processor (407) is applied to obtain key terms. Further, image recognition (408) is applied to obtain labels, which are converted to key terms. The key terms from the natural language processor and image recognition are obtained by the web crawler (403).

Further, the web crawler (403) crawls the merchant website (406), and loads information from the merchant website. The natural language processor (407) is applied to obtain key terms, and image recognition (408) is applied to obtain labels, which are converted to key terms. The key terms from the natural language processor and image recognition are obtained by the web crawler (403).

The web crawler (402) returns the key terms to the MCC service (402). The MCC service (402) combines the key terms through normalization, applies dynamic weights to each key term, and checks or generates the key term scores (e.g., frequency values). The key term scores are used to identify a matching merchant category code. The MCC service (402) returns the matching merchant category code to the MCC resource (401). Thus, the MCC resource (401) may assign the matching merchant category code to the merchant.

Embodiments of the invention may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the invention.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the invention, may perform data comparison. Data comparison may be used to compare two or more data values (e.g., A, B). For example, one or more embodiments may determine whether $A>B$, $A=B$, $A \mathrel{!}= B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for computing system learning of a merchant category code, the method comprising:
   accessing a social media platform using administrative information of a merchant to obtain social media information of the merchant;
   performing natural language processing on the social media information to add a first plurality of key terms to a first merchant terminology corpus defined for the merchant;
   normalizing the first plurality of key terms in the first merchant terminology corpus;
   calculating, for each key term in the first merchant terminology corpus and for each merchant category code of a plurality of merchant category codes, a frequency value for the merchant category code to obtain a plurality of frequency values;
   aggregating the plurality of frequency values across the first plurality of key terms in the first merchant terminology corpus to obtain a plurality of aggregated values, the plurality of aggregated values comprising an aggregated value for the merchant and for each of at least a subset of the plurality of merchant category codes;
   select, using the plurality of aggregated values, the matching merchant category code for the merchant; and
   applying the matching merchant category code to the merchant.

2. The method of claim 1, further comprising:
   receiving the administrative information from the merchant during a merchant account creation process; and
   recommending the matching merchant category code to the merchant during the merchant account creation process.

3. The method of claim 1, further comprising:
   receiving, from the merchant, a merchant account information comprising a merchant provided merchant category code and the administrative information,
   wherein applying the matching merchant category code to the merchant comprises validating the merchant provided merchant category code using the matching merchant category code.

4. The method of claim 1, further comprising:
   obtaining training data having a plurality of validated merchant category codes assigned to corresponding merchants;
   obtaining a second merchant terminology corpus for a validated merchant category code of the plurality of validated merchant category codes;
   ranking a second plurality of key terms in the second merchant terminology corpus according to frequency to obtain ranking;
   normalizing the second plurality of key terms in the second merchant terminology corpus to obtain a plurality of normalized key terms;
   selecting a subset of the plurality of normalized key terms according to the ranking,
   filtering the first plurality of key terms in the first merchant terminology corpus according to the subset of the plurality of normalized key terms.

5. The method of claim 4, wherein normalizing the second plurality of key terms comprises:
   normalizing, for each normalization technique of a plurality of normalization techniques, normalizing the second plurality of key terms using a normalization technique;
   calculating an accuracy measure for each of the plurality of normalization techniques using the training data; and
   selecting an optimal normalization technique according to the accuracy measure.

6. The method of claim 1, further comprising:
   testing a plurality of thresholds on training data having a plurality of validated merchant category codes assigned to corresponding merchants to obtain a target threshold,
   wherein aggregating the plurality of frequency values uses the target threshold.

7. The method of claim 1, further comprising:
performing image recognition on the social media information to add a second plurality of key terms to the first merchant terminology corpus.

8. The method of claim 1, wherein normalizing the first plurality of key terms comprises combining at least two key terms in the first plurality of key terms using Levenstein distance.

9. The method of claim 1, wherein normalizing the first plurality of key terms comprises identifying a root of a key term in the first plurality of key terms using Stem Snowball.

10. The method of claim 1, wherein calculating the frequency value for a key term in the first merchant terminology corpus and for a merchant category code of the plurality of merchant category codes comprises:
dividing a number of times that the key term is in the merchant category code by a number of merchant category codes having the key term.

11. A system for computing system learning of a merchant category code, the system comprising:
a data repository for storing a plurality of merchant category codes; and
a computer processor operably connected to the data repository and configured to execute a merchant category code predictor, the merchant category code predictor for causing the computer system to:
access a social media platform using administrative information of a merchant to obtain social media information of the merchant;
perform natural language processing on the social media information to add a first plurality of key terms to a first merchant terminology corpus defined for the merchant;
normalize the first plurality of key terms in the first merchant terminology corpus;
calculate, for each key term in the first merchant terminology corpus and for each merchant category code of the plurality of merchant category codes, a frequency value for the merchant category code to obtain a plurality of frequency values;
aggregate the plurality of frequency values across the first plurality of key terms in the first merchant terminology corpus to obtain a plurality of aggregated values, the plurality of aggregated values comprising an aggregated value for the merchant and for each of at least a subset of the plurality of merchant category codes;
select, using the plurality of aggregated values, the matching merchant category code for the merchant; and
apply the matching merchant category code to the merchant.

12. The system of claim 11, further comprising a financial application executing on the computer processor, the financial application comprising the merchant category code predictor.

13. The system of claim 11, further comprising a user interface executing on the computer processor, the user interface for causing the computer processor to:
receive the administrative information from the merchant during a merchant account creation process; and
recommend the matching merchant category code to the merchant during the merchant account creation process.

14. The system of claim 11, further comprising an auditor executing on the computer processor, the auditor for causing the computer processor to:
receive, from the merchant, a merchant account information comprising a merchant provided the merchant category code and the administrative information,
wherein applying the matching merchant category code to the merchant comprises validating the merchant provided the merchant category code using the matching merchant category code.

15. A non-transitory computer readable medium for computing system learning of a merchant category code, the non-transitory computer readable medium comprising computer readable program code for:
accessing a social media platform using administrative information of a merchant to obtain social media information of the merchant;
performing natural language processing on the social media information to add a first plurality of key terms to a first merchant terminology corpus defined for the merchant;
normalizing the first plurality of key terms in the first merchant terminology corpus;
calculating, for each key term in the first merchant terminology corpus and for each merchant category code of a plurality of merchant category codes, a frequency value for the merchant category code to obtain a plurality of frequency values;
aggregating the plurality of frequency values across the first plurality of key terms in the first merchant terminology corpus to obtain a plurality of aggregated values, the plurality of aggregated values comprising an aggregated value for the merchant and for each of at least a subset of the plurality of merchant category codes;
select, using the plurality of aggregated values, the matching merchant category code for the merchant; and
applying the matching merchant category code to the merchant.

16. The non-transitory computer readable medium of claim 15, further comprising computer readable program code for:
receiving the administrative information from the merchant during a merchant account creation process; and
recommending the matching merchant category code to the merchant during the merchant account creation process.

17. The non-transitory computer readable medium of claim 15, further comprising computer readable program code for:
receiving, from the merchant, a merchant account information comprising a merchant provided merchant category code and the administrative information,
wherein applying the matching merchant category code to the merchant comprises validating the merchant provided merchant category code using the matching merchant category code.

18. The non-transitory computer readable medium of claim 15, further comprising computer readable program code for:
obtaining training data having a plurality of validated merchant category codes assigned to corresponding merchants;
obtaining a second merchant terminology corpus for a validated merchant category code of the plurality of validated merchant category codes;
ranking a second plurality of key terms in the second merchant terminology corpus according to frequency to obtain ranking;

normalizing the second plurality of key terms in the second merchant terminology corpus to obtain a plurality of normalized key terms;

selecting a subset of the plurality of normalized key terms according to the ranking, filtering the first plurality of key terms in the first merchant terminology corpus according to the subset of the plurality of normalized key terms.

19. The non-transitory computer readable medium of claim 18, wherein normalizing the second plurality of key terms comprises:

normalizing, for each normalization technique of a plurality of normalization techniques, normalizing the second plurality of key terms using a normalization technique;

calculating an accuracy measure for each of the plurality of normalization techniques using the training data; and selecting an optimal normalization technique according to the accuracy measure.

20. The non-transitory computer readable medium of claim 15, wherein calculating the frequency value for a key term in the first merchant terminology corpus and for a merchant category code of the plurality of merchant category codes comprises:

dividing a number of times that the key term is in the merchant category code by a number of merchant category codes having the key term.

\* \* \* \* \*